Oct. 15, 1957  L. J. GEIL  2,809,496
BOAT TRAILERS
Filed May 13, 1953  3 Sheets-Sheet 1

INVENTOR.
LEO J. GEIL
BY Ralph W. Kalish

Oct. 15, 1957      L. J. GEIL      2,809,496
BOAT TRAILERS
Filed May 13, 1953      3 Sheets-Sheet 2
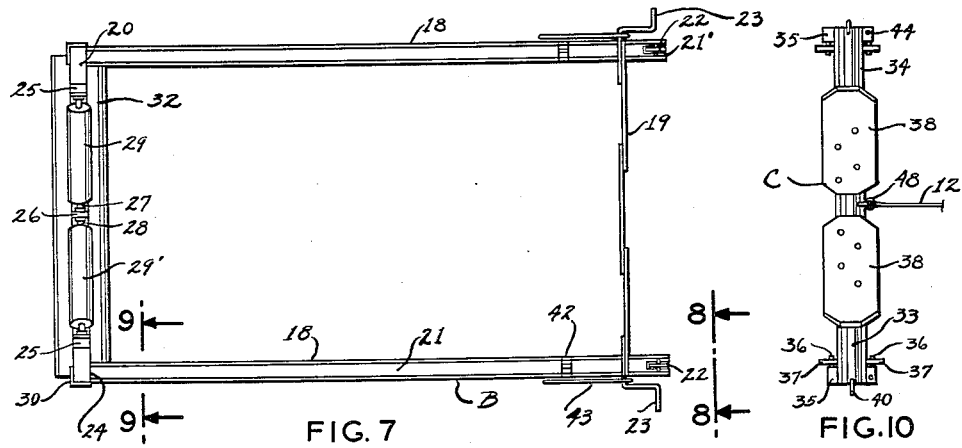
FIG. 7     FIG. 10
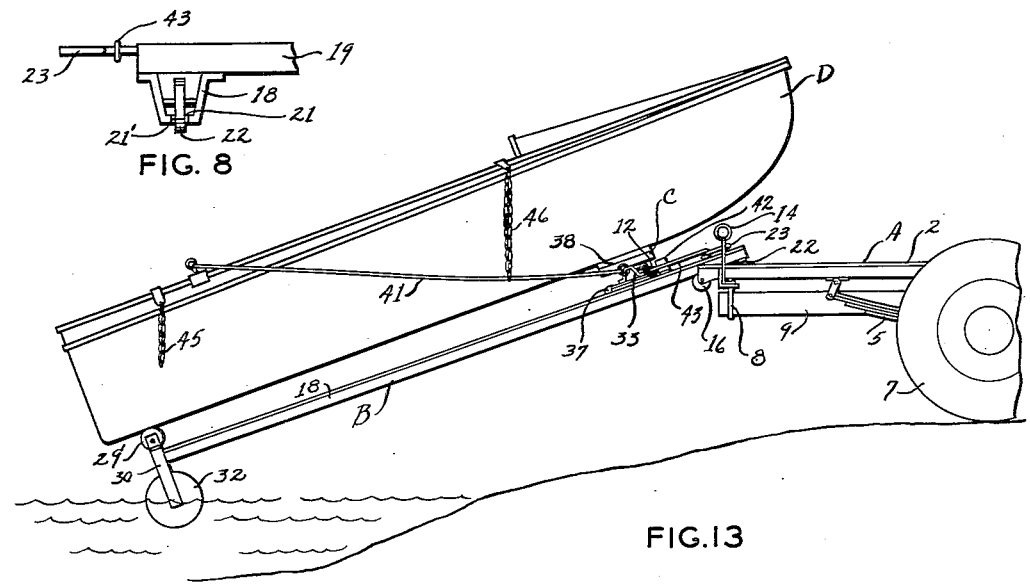
FIG. 8
FIG. 13
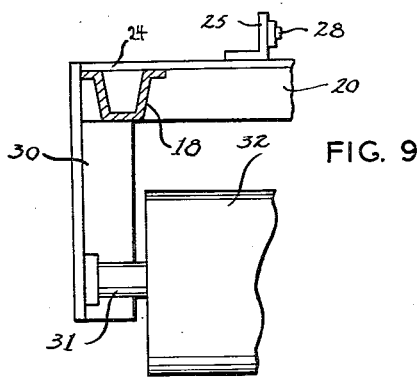
FIG. 9
INVENTOR.
LEO J. GEIL
BY Ralph W. Kalish

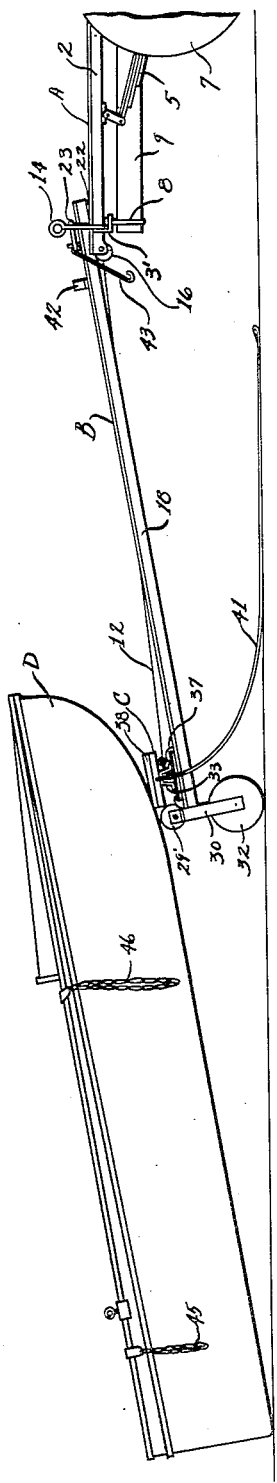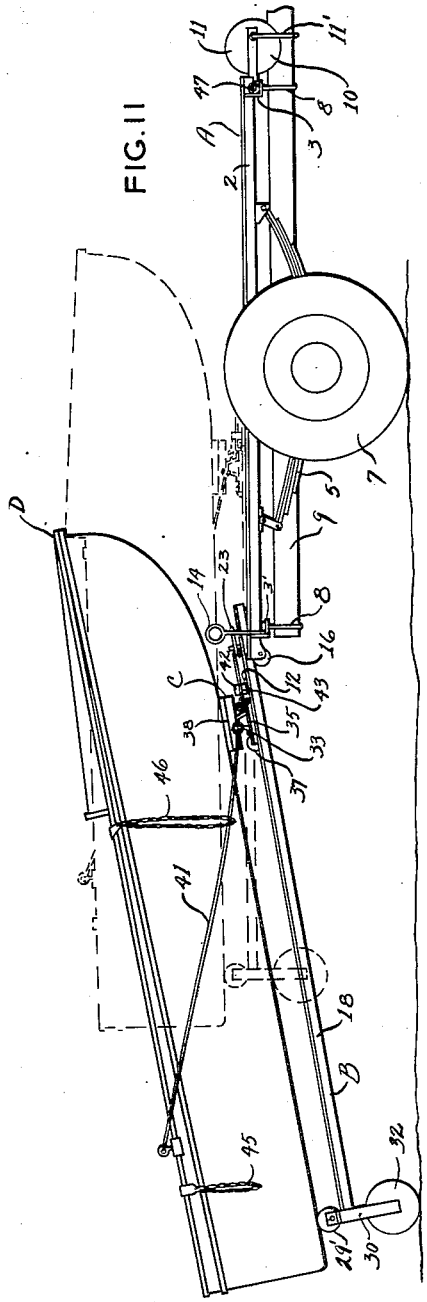

United States Patent Office 2,809,496
Patented Oct. 15, 1957

2,809,496

BOAT TRAILERS

Leo J. Geil, St. Johns, Mo.

Application May 13, 1953, Serial No. 354,788

6 Claims. (Cl. 61—67)

This invention relates in general to trailers and, more particularly, to a boat trailer adapted for facile launching and reloading of a boat carried thereby.

Heretofore trailers of the type utilized for boats have been provided with independent cooperating, ramp-forming members for travel therealong of a boat during launching operations. Such ramp elements have not been integrated mechanically with the trailer structure but required manual positioning prior to use with consequent restoration by hand to a position of rest after usage. Besides occasioning great inconvenience to the user, such means have necessitated marked care in locating launching sites which had to be level and reasonably dry, since such independent members could not inherently compensate for any unevenness of the ground therebetween and readily became mired or bedded in wet, soft terrain from which removal was difficult.

In view of the foregoing, launching and reloading operations with trailers having such relatively unwieldy ramp elements were not simple in accomplishment and could not thus be readily performed by a single individual.

It is a primary object of this invention to provide a boat trailer which integrally incorporates ramp-forming means adapted for movement with a boat carrier along a base frame into operative or boat launching position and which is mechanically returned to resting position during the reloading operation.

A further object is to provide a boat trailer which embodies novel means operable by a single individual for moving a boat from a position of rest upon the trailer into floating position on an adjacent body of water.

An additional object of this invention is to provide a boat trailer having an amphibious ramp-forming carriage member movable longitudinally along a base frame, by operation of which a boat may be launched directly into a body of water or as easily discharged on land as for inspection and repair purposes.

A still further object of this invention is to provide a boat trailer having a ramp-forming carriage member which is adapted for travel when in fully extended operative position and which will not become mired or stuck in soft ground.

A further object of this invention is to provide a boat trailer which may be economically manufactured; which is reliable in operation and durable in usage; and which is easily operated by an average unskilled individual. These and other detailed objects are obtained by the structure illustrated in the accompanying drawings (three sheets) in which—

Figure 7 is a plan view of the intermediate carriage;

Figure 8 is a fragmentary enlarged detail view taken on line 8—8 of Figure 7;

Figure 9 is a transverse horizontal section taken on line 9—9 of Figure 7;

Figure 10 is a plan view of the boat carrier;

Figure 11 is a side view illustrating the center carriage in fully extended position with the wheel float engaging the ground;

Figure 12 is a side view showing the boat carrier at its rearward limit of travel with the boat being launched therefrom; and Figure 13 is a side view similar to Figure 11 but illustrating the wheel float being accepted on water.

Figure 1:
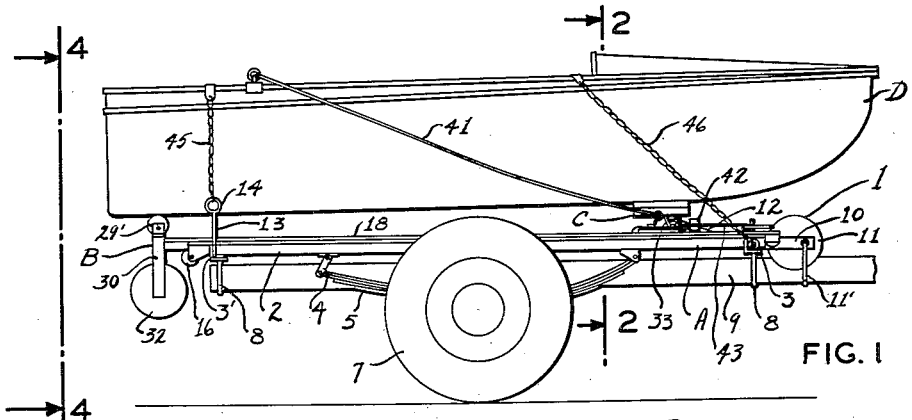
Figure 1 is a side view of a boat trailer constructed in accordance with and embodying the present invention, showing a boat in supported position thereon.
Figures 2, 3:
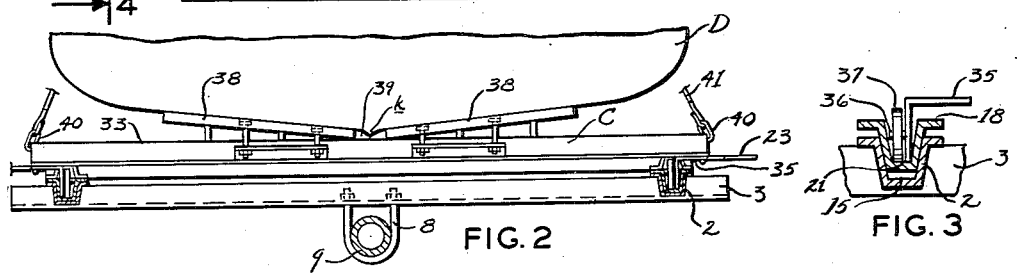
Figure 2 is a transverse vertical section taken on line 2—2 of Figure 1.
Figure 3 is an enlarged detail sectional view, taken from Figure 2, of the cooperating side members of the base frame and intermediate carriage.

Referring now to the drawings which illustrate the preferred embodiment of the present invention, 1 designates generally a boat trailer comprising a base frame A having a pair of parallel, spaced side members 2 and transversely extending front and back end members 3, 3', respectively, fixedly secured at their ends to said side members 2. Suspended from each side member 2 by suitable shackles 4 are longitudinal leaf springs 5 connected to an axle 6 provided with two traction wheels 7. Suitably supported from end members 3, 3', as by U-bolts 8, is a telescopic drawbar 9 parallel to side members 2 and projecting forwardly of front end member 3 for securement by conventional means to a transporting vehicle (not shown).

Figures 4, 6:
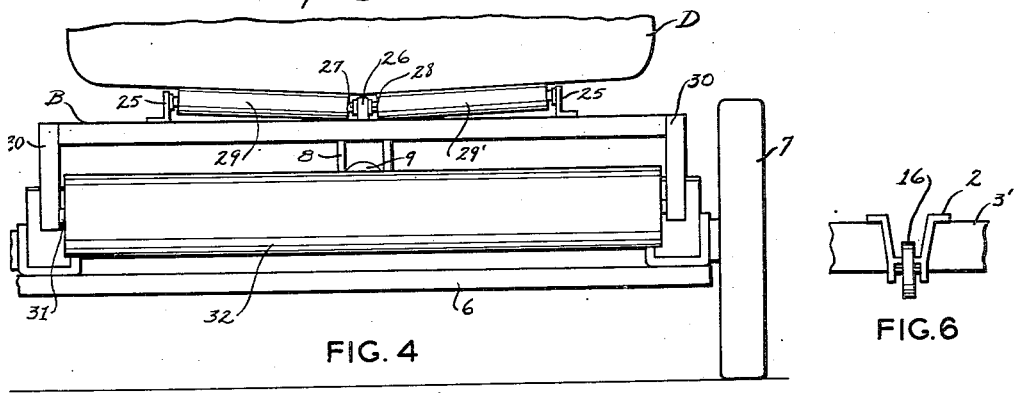
Figure 4 is an end view taken on line 4—4 of Figure 1.
Figure 6 is an enlarged detail end view taken on line 6—6 of Figure 5.
Figure 5:
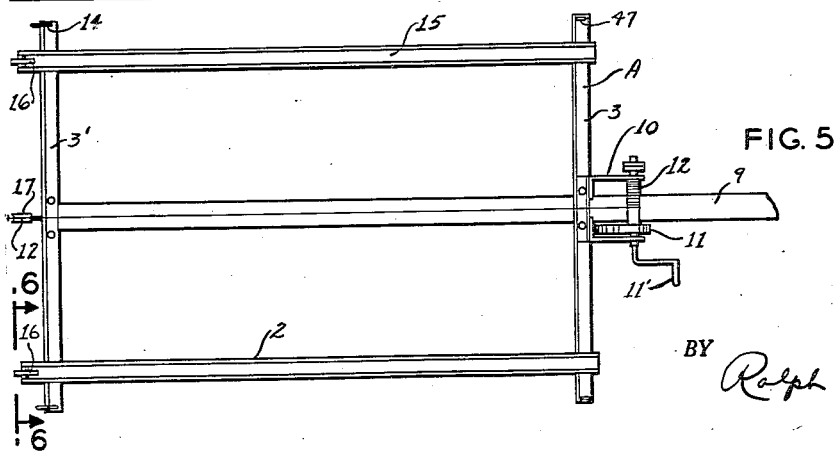
Figure 5 is a plan view of the base frame.

On front end member 3 is a bracket 10 mounting a winch 11 provided with the usual crank arm 11' and having a single cable 12 wound thereabout. End members 3, 3', being fabricated preferably of angle section, each project at their ends beyond side members 2 (Figure 5) with upright rods 13 having eyelets 14 formed at their upper extremities being rigidly mounted on the projecting ends of back end member 3'. Side members 2 are preferably of V-shape cross section, opening upwardly, for providing trackways 15 and at their rearward ends each suitably carries, for free rotation, a roller 16, the upper periphery of which projects above the bases of trackways 15 (Figure 6). Back end member 3' mounts centrally on its rearwardly directed surface a pulley 17 for guiding winch cable 12, for purposes shown hereinbelow.

Disposed supportedly upon base frame A for traverse along trackways 15 is an intermediate carriage B consisting of a rectangular frame having side members 18 and forward and rearward cross members 19, 20, respectively (Figure 7). Side members 18 are in registration upon base frame side members 2 and similarly thereto are of V-shaped or groove-forming cross section to present trackways 21. At their forward ends, each side member 18 is recessed in its base portion, as at 21', for limited downward extension therethrough of a roller 22 for travel along trackways 15, said rollers being disposed for rotation upon a pin rigidly extending between the opposed walls of said side member 18. At their opposite or rearward ends, side members 18 project beyond the adjacent ends of side members 2 and are there supported upon rollers 16 (Figure 1). Thus, rollers 22 and 16 coact to provide mobility for carriage B whereby smooth movement thereof along trackways 15 may be effected.

Forward cross member 19 is spaced rearwardly from the forward ends of side members 18 with its ends projecting therebeyond and being bent to form offset detent arms 23 for abutment against upright rods 13 to limit the rearward travel of intermediate carriage B as shown in Figure 11. Rearward cross member 20 is also desirably of angle section with its horizontal flange rigidly secured, as by welding, upon the upper edges of side members 18 with its lateral margins thus providing stops 24 which extend across trackways 21. Mounted upon the said horizontal flange of said cross member 20 are spaced end brackets 25 and an intermediate bracket 26 for reception of the ends of rods 27, 28, mounting for rotation elongated, transverse rollers 29, 29', in end to end relation. Rods 27, 28, are presented for inclination downwardly toward intermediate bracket 26 with consequent inwardly and downwardly canting of rollers 29, 29' (Figure 4). Fixed to the opposite ends of cross member 20 are depending arms 30 within which are journaled the ends of a shaft 31 carrying a relatively large cylindrical wheel-float or hollow drum 32.

For reasons to be discussed in more detail hereinafter, when trailer 1 is in transport condition, as shown in Figure 1, intermediate carriage B will be so disposed upon base frame A that rollers 22 will extend beyond the forward ends of side members 2 so that the rearward peripheral portions thereof will abut against the lower edges of said side members 2 for inhibiting any untoward travel of said carriage B.

Provided for travel along trackways 21 of intermediate carriage B is a boat carrier C comprising a cross bar 33 of general channel shape with outwardly projecting flanges 34 (Figure 10) to the under surface of which, just inwardly of the ends of cross bar 33 are affixed, as by welding, angle brackets 35. Each bracket 35 has in its depending flange a pair of spaced pins 36 on which are mounted, in tandem fashion, wheels 37 for supporting boat carrier C upon, and guiding same along, trackways 21 of intermediate carriage B.

Engaged upon cross bar 33 is a pair of boat mounting plates 38, made of wood or like material, which are inclined downwardly and inwardly toward each other with their inner ends being spaced apart, as at 39, for accommodating therebetween the keel $k$ of a boat D supported on said plates 38. Boat carrier C contacts boat D immediately rearwardly of the bow, as shown in Figure 1, while the stern of boat D is restingly supported upon elongated rollers 29, 29'. The mounting plates 38 (as shown in Figure 1) may be slightly higher than rollers 29, 29', so that through gravity boat D will have a tendency to slide rearwardly along plates 38, and rollers 29, 29'. The angular disposition of plates 38 and rollers 29, 29', is such as to accommodate the upwardly and outwardly sloping bottom of boat D. Plates 38 may, if desired, be adapted for relative angular adjustment, as by hinged members (not shown), so that the varying degrees of bottom slope encountered in boats of this type may be readily accommodated.

At its ends, cross bar 33 is provided with chain links 40, for detachable securement thereto, as by hooks, of retaining straps 41 engaged at their opposite ends upon boat D. Upstanding from each side member 18 spacedly rearwardly of forward cross member 19 is a stop 42 for abutment thereagainst of the forward wheels 37 of a boat carrier C whereby the forward extent of travel thereof along carriage B is determined. For direct connection between boat carrier C and intermediate carriage B there is provided a pair of lock rods 43 pivotally engaged upon, at opposite ends of, forward cross member 19 for swingable movement, and having a hook provided upon the free ends thereof for engagement within apertures 44 at the ends of carrier cross bar 33. Provided for holding boat D against inadvertent displacement during transport are chains 45, 46, which are respectively engageable to eyelets 14 on rods 13 and with openings 47 located at the ends of base frame forward member 3. Centrally of the forward face of boat carrier cross bar 33 there is secured an eyelet 48 for engaging the end of winch cable 12 whereby carrier C is movable in response to operation of winch 11, which, though shown as manually operable, may be motor driven, if desired.

In order to launch boat D from its transport position, as shown in Figure 1, the operator will, after locating the transporting vehicle at the preferred site, release chains 45, 46, to free boat D from engagement to base frame A, and lift the front portion of carriage B to place rollers 22 within trackways 15. Thereupon, winch 11 is operated for unwinding cable 12, which allows intermediate carriage B to travel rearwardly along base frame A since, by continued retaining engagement of lock bars 43 and straps 41, said carriage B, boat carrier C, and boat D are maintained together as a single unit or assembly. The slight elevation of the bow portion of boat D above its stern by the height differential between rollers 29, 29', and plates 38, will through gravity provide the necessary impetus for initiating movement of the said assembly, despite the positionment of trailer 1 upon level ground. However, obviously, if such height differential were not provided, a light pushing by the operator upon the boat bow would be sufficient to instigate rearward travel of the said assembly which would continue as the center of gravity of the assembly shifted relative to frame A. Cable 12 counteracts the rearward tendency of the engaged assembly so that full control is assured the operator at all times. By action of rollers 22 and 16, intermediate carriage B travels horizontally rearwardly along and beyond base frame A, as shown in dotted lines in Figure 11, until by gravity the same with the engaged carrier C and boat D will swing downwardly in pivoting about roller 16, bringing wheel float 32 into support upon the ground (Figure 11) or afloat upon water (Figure 13), whereupon carriage B is presented in ramp-forming attitude. The rearward travel of the said assembly will continue until detent arms 23 abut rods 13 (Figures 11 and 13) which determines the extent of rearward movement of carriage B. Thus, said carriage B is mobile when in inclined position, through operation of wheel float 32 which provides an amphibious character to trailer 1 since it freely rolls over terrain and floats on water.

Lock bars 43 are then disengaged from apertures 44 so that boat carrier C and boat D may henceforth jointly move on wheels 37 along trackways 21 of the stationary inclined carriage B, said movement of carrier C and boat D being controlled by continued unwinding of cable 12. Boat D will move easily over rollers 29, 29', as carrier C travels downwardly and will be received on water as indicated in Figure 13, floating on the surface thereof until the boat is completely afloat. As shown in figure 12, boat D may be discharged upon the ground as for inspection or repair purposes, although in this case it is, of course, necessary that the boat be properly handled to avoid scraping of its bottom. As boat carrier C approaches the end of its rearward travel, strap 41 is released so that boat D is freed for launching or discharge therefrom. The release of strap 41 may be made at any convenient point so that the operator will not inadvertently get wet as the boat goes into the water. Control of the floating boat may be maintained by a bow line or by mere manual gripping where suitable. In any event, the boat-launching travel of carrier C will be arrested by engagement of rear wheels 37 against stops 24 (Figure 12).

Thus, by the unique relationship of the various elements of trailer 1, the boat-launching operation is easily accomplished and completely controlled at all times by proper operation of winch 11. By various disengageable locking means whereby the several units may be engaged to one another, complete control against unreliable functioning of any one element is provided. As shown, boat-launching may be executed by a single individual. Furthermore, due to the unique character of wheel float 32, there is no need for the operator to be unduly concerned with the character of the terrain at the launching site. If the same is wet and soggy, said wheel float 32 will move effectively therethrough and not become mired.

The reloading operation is performed as follows: Intermediate carriage B and boat carrier C are disposed in full rearward position (Figure 12) at the completion of the launching maneuver. The bow of boat D is lifted until the portion just rearwardly thereof is supported upon mounting plates 38, whereupon strap 41 is suitably engaged within chain links 40. The operator thereupon winds cable 12 upon winch 11 by proper rotation of crank arm 11' which causes boat carrier C to be pulled upwardly along the inclined intermediate carrier B. Boat D will thus be raised, assisted by rollers 29, 29', from the water or ground as the case may be. When boat carrier C has arrived at the forward limit of its travel, that is, when the wheels 37 thereof abut against stops 42, lock bars 43 are engaged so that further winding of winch cable 12 will effect accompanying forward or return movement of intermediate carriage B. Said carriage B will maintain its inclined attitude until the center of gravity of the joined mobile assembly, comprising carriage B, carrier C, and boat D, shifts relatively forwardly, whereupon the same will be rocked upwardly or clockwise about roller 16 into substantially horizontal position so that its further movement will thence be forwardly along base frame A. This travel is continued until rollers 22 roll off the forward ends of trackways 15 whereupon carriage B is in full forward position. Operation of winch 11 is then stopped and chains 45, 46, are secured, whereby boat D is now fully restored to supported position on trailer 1 preparatory to transport.

By their specific construction, base frame A and intermediate carriage B are relatively light, yet very strong and, hence, permit the launching and reloading operation to be performed without the development of any untoward strain. The mobility of intermediate carriage B by means of wheel float 32 allows movement of the trailer 1 when said carriage is in fully extended position, which could not have been done with trailers heretofore known. Thus, should the operator desire for any reason to alter the position of the trailer, it would not be necessary to first load carriage B on frame A. Trailers of the type herein disclosed can be most economically manufactured and through its simplicity of parts is most durable in usage.

The details of construction can be varied without departing from the spirit of the invention and the exclusive use of those modifications coming within the scope of the claims contemplated.

What is claimed is:

1. A boat trailer comprising a wheeled base frame, longitudinal trackways provided on said base frame, an intermediate carriage disposed on said base frame and having trackway-forming side members presented registeringly within the trackways of said base frame, means for rendering said carriage mobile with respect to said base frame whereby the side members of said carriage move longitudinally along the trackways of said base frame, said carriage having a pair of elongated boat-supporting rollers mounted on its rearward end, a wheeled boat carrier member mounted on the trackways of the carriage for travel therealong, plate members mounted on said carrier for cooperating with said elongated rollers in supporting a boat, disengageable locking members for securing said carriage and boat carrier together whereby the same may move jointly with respect to said base frame, and means for controlling the movement of said carriage and carrier.

2. A boat trailer comprising a wheeled base frame having parallel side members provided with trackways throughout their length, a first roller member mounted at the rearward end of each side member and projecting above the base of said trackways, a carriage supported on said base frame and having parallel side members received within the trackways of said base frame and supported at one end on said first rollers, a second roller carried by each carriage side member for supporting same near its opposite end on the trackways of the base frame, the side members of said carriage having trackways provided therein, said carriage normally projecting beyond the rearward end of said base frame, a wheel float mounted on said projecting end of the carriage for supporting same when in operative position whether on land or water, a wheeled boat carrier mounted on the trackways of the side members of said carriage for travel therealong, disengageable means for securing said carriage and boat carrier together for unitary movement relative to said base frame, and detent means for limiting the travel of said carriage with respect to the base frame.

3. A boat trailer comprising a wheeled base frame, longitudinal trackways provided on said base frame, an intermediate carriage disposed on said base frame and having trackway-forming side members presented registeringly within the trackways of said base frame, means for rendering said carriage mobile with respect to said base frame whereby the side members of said carriage move longitudinally along the trackways of said base frame, said carriage having a pair of elongated boat-supporting rollers mounted on its rearward end, a wheeled boat carrier member mounted on the trackways of the carriage for travel therealong, and plate members mounted on said carrier for cooperating with said elongated rollers in supporting a boat.

4. A boat trailer as described in claim 3, wherein a wheel float is mounted on the carriage spacedly below the elongated rollers.

5. A boat trailer as described in claim 3 wherein stop members are provided on the trackways of said carriage for limiting the travel of the boat carrier therealong, and detent means for limiting rearward travel of said carriage with respect to the base frame.

6. A boat trailer as described in claim 3 wherein a first roller member is mounted at the rearward end, and projecting above the base, of each longitudinal trackway of the base frame, and a second roller carried by each carriage side member for supporting same adjacent one end on the trackways of the base frame.

References Cited in the file of this patent

UNITED STATES PATENTS

| | | |
|---|---|---|
| 1,773,999 | Haight | Aug. 26, 1930 |
| 2,082,663 | Slater | June 1, 1937 |
| 2,389,338 | Zorc | Nov. 20, 1945 |
| 2,485,793 | Vassar | Oct. 25, 1949 |
| 2,676,716 | Sallis | Apr. 27, 1954 |
| 2,711,259 | Jones | June 21, 1955 |

FOREIGN PATENTS

| | | |
|---|---|---|
| 496,549 | Great Britain | Nov. 28, 1938 |
| 849,376 | Germany | Sept. 15, 1952 |